Figure 1:
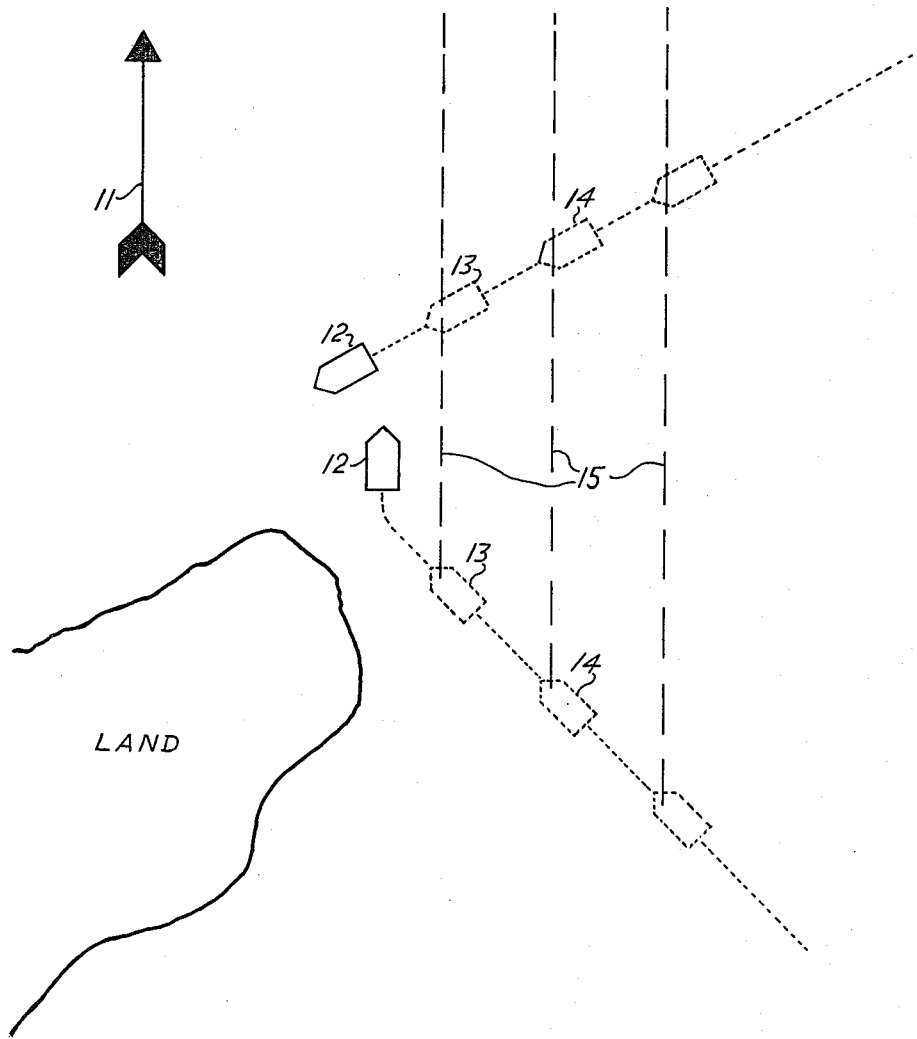

Dec. 17, 1963  W. M. HALL  3,114,908
RADAR NAVIGATIONAL DISPLAY APPARATUS WITH
A PLURALITY OF SWEEP VOLTAGES
Filed May 19, 1959  4 Sheets-Sheet 2

A  B  C

A  B  C

A  B  C

A  B  C

INVENTOR
WILLIAM M. HALL
BY
ATTORNEY

Dec. 17, 1963

W. M. HALL 3,114,908

RADAR NAVIGATIONAL DISPLAY APPARATUS WITH
A PLURALITY OF SWEEP VOLTAGES

Filed May 19, 1959

4 Sheets-Sheet 3

A

B

C

A

B

C

A

B

C

A

B

C

INVENTOR
WILLIAM M. HALL

BY *N. Vincent Marsh*

ATTORNEY

INVENTOR
WILLIAM M. HALL
ATTORNEY

United States Patent Office 3,114,908
Patented Dec. 17, 1963

3,114,908
RADAR NAVIGATIONAL DISPLAY APPARATUS WITH A PLURALITY OF SWEEP VOLTAGES
William M. Hall, Lexington, Mass., assignor to Raytheon Company, Lexington, Mass., a corporation of Delaware
Filed May 19, 1959, Ser. No. 814,221
9 Claims. (Cl. 343—10)

The present invention pertains to apparatus for displaying radar information and more particularly relates to a radar information display system utilizing a memory device for optionally recording the history of targets within the area under surveillance and adapted to display current as well as recorded information in different ways, at the option of the observer.

While this invention is applicable to many problems involving the measurement of the course and speed of moving objects, it finds particularly advantageous application in the field of marine navigation and contemplates particularly the provision of apparatus on a ship for indicating continuously and automatically the position and course of objects which may be a hazard to the equipped or own ship.

The most useful radar display presentation for navigational purposes is the plan position indicator, commonly termed PPI, which provides a representation of the surrounding locality in polar coordinates, that is, azimuth angle and range. There are, at present, two well-known types of plan position presentation for ship navigation, viz., relative-bearing presentation, and true-bearing presentation. In the relative-bearing presentation the equipped or own ship's position is represented by the center of the cathode ray tube display and the ship's heading always appears at the zero reference angle on the tube circumference which is at the top of the tube. The azimuth angle of all objects shown on the presentation is, therefore, read relative to the ship's heading. When the ship yaws or makes a turn, it is the picture on the display tube which is rotated while the ship's heading remains undisturbed on the display. Since in the conventional indicator the display tube has a fixed position relative to the ship, the picture rotates on the tube face when the ship's heading changes thereby causing the picture to smear where a long persistence tube is used.

In the true-bearing presentation own ship's position is represented by the center of the display tube and the representation of the area surveyed is stabilized so that true north is always at the top of the tube face. That is, true north is at the zero-bearing angle and all true-bearing azimuth angles are measured in degrees from the top of the tube circumference in a clockwise direction. The true presentation is obtained by interconnecting the vessel's gyro compass or other stable reference element with the radar display system to compensate for changes in the vessel's heading. When the ship's heading is changed, the true-bearing presentation is advantageous, because the picture of the area on the display tube does not rotate so that blurring of the picture due to turning of the ship is avoided. However, because the ship's heading varies on the display tube, a mental reorientation must usually be made by the navigator when resort is had to visual observation, and therefore the true-bearing presentation is less popular than relative-bearing presentation with many users.

Present marine radar systems are severely limited in their ability to present a situation most advantageously for different purposes, needs or preferences. For example, the most versatile systems provide only conventional stabilized relative-bearing display or, alternately, conventional true-bearing display. Although other systems are known they in essence represent only different or minor variations of the relative-bearing, true-bearing presentation.

The inability of present-day systems to present any given situation in accordance with the preference of individual observers and/or most advantageously for different specific needs or situations has given rise to the feeling that the radar presentation was not ideal in that there should be some way to improve the presentation so that it gives a picture on which it is easier to interpret a given situation. Prior art systems that combine certain desirable features of both true-bearing and relative-bearing presentations are subject to other substantial disadvantages by reason of their design requirements.

The invention here disclosed is intended to enhance the utility of radar by (1) making available to a ship's officer, radar observer or the like a presentation most suited to his preference and immediate or specific needs, (2) presenting a picture so that collision courses can be determined without the necessity of mental calculations, (3) permitting, for example, the display of the development of a situation in addition to the display of the current presentation of moving targets including their tracks, and (4) permitting the combination on a display device of old and current information in any number of different ways in order to more suitably provide the operator with a knowledge of past as well as present position of own ship, other ships, and fixed objects such as land masses and buoys.

The invention employs a radar system comprised of a radar receiver and transmitter for detection of fixed and moving objects and which has a video output signal, a radial sweep output signal starting coincident with the transmitted pulse, and an antenna-bearing output signal. Also employed are a PPI cathode ray tube, a memory device, a compass and a position or speed information source. Circuit means more completely described hereinafter provide four different sets of deflection voltages which may be selectively applied to the memory device and the PPI either jointly or severally. The video output signal of the radar receiver is supplied to the video input circuit of the memory device or storage tube and is also combined with the video output of the storage tube to provide the video input to the PPI.

The novel features which are believed to be characteristic of the invention are set forth with particularity in the appended claims. The invention itself, however, both as to its organization and method of operation together with further objects and advantages thereof, may best be understood by reference to the following description taken in connection with the accompanying drawings in which:

FIG. 1 is an illustrative map;
FIGS. 2 through 9 are PPI representations illustrative of typical presentations provided by the invention; and
FIG. 10 is a schematic diagram of an embodiment of the invention.

FIG. 1 illustrates a typical map showing own ship proceeding northwest past an end of land on a collision course with another ship. About the time it passes the end of land it turns to the right to pass behind the other ship. The direction of true north is indicated by the arrow 11. The present positions 12 of own ship and the other ship are indicated by solid lines and previous positions 13—14 including course are shown by broken lines. Parallel cursors or bearing markers 15 indicate the prior existence of a collision course.

FIGS. 2 through 9 are representations provided by the invention illustrative of typical presentations of the last three marked positions 12, 13, and 14 in sequence of own ship and the other ship as shown in FIG. 1, for certain combinations of 1a—1b, 2a—2b and 3a—3b discussed hereinafter. In each of the FIGS. 2 through 9, FIG. A represents the presentation at position 14, FIG. B represents the presentation at position 13, and FIG. C represents the presentation at present time, position 12.

With reference to the problem of data presentation to preven collisions the following choices of display more completely described hereinafter can be made independently.

(1)

(a) Own ship can stay at the center of the display (ship stationary); or (b) Own ship can move in proportion to its absolute motion (ship moves).

(2)

(a) Own ship heading can stay at 0° (relative bearing); or (b) North can stay at 0° (true bearing).

(3)

(a) Old (stored) data can be presented so that its position, relative to own ship at the time of original observation, appears as the position relative to the current location of own ship on the display (relative-motion display); or (b) Old (stored) data can be moved in accordance with own ship's motion (absolute-motion display). This, in effect, means that the stored return from stationary targets such as land is presented so that it superposes directly on the current return from these same targets.

Figure 2:
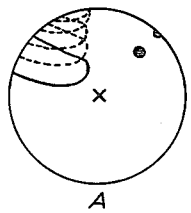
Figure 2:
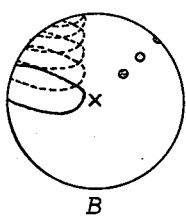
Figure 2:
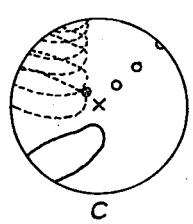
Figure 3:
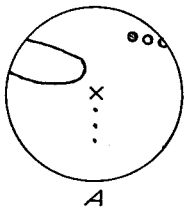
Figure 3:
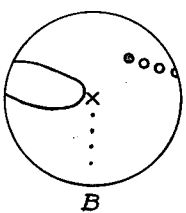
Figure 3:
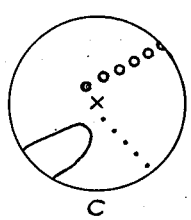
Figure 4:
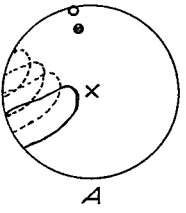
Figure 4:
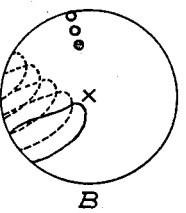
Figure 4:
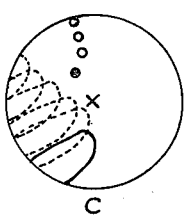
Figure 5:
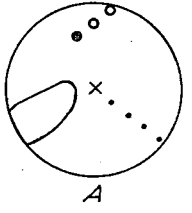
Figure 5:
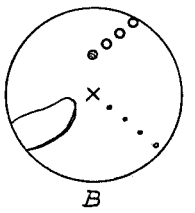
Figure 5:
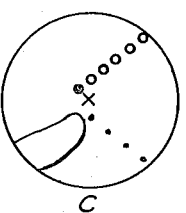
Figure 6:
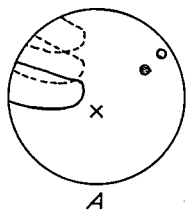
Figure 6:
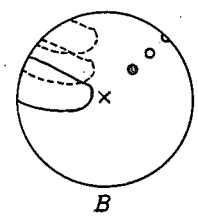
Figure 6:
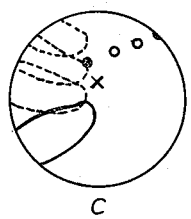
Figure 7:
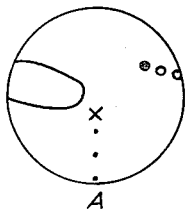
Figure 7:
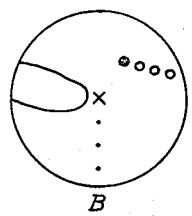
Figure 7:
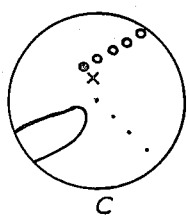
Figure 8:
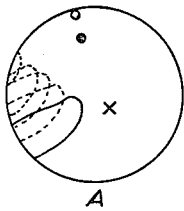
Figure 8:
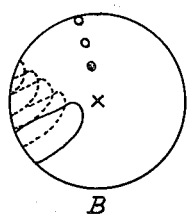
Figure 8:
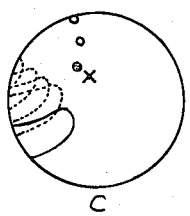
Figure 9:
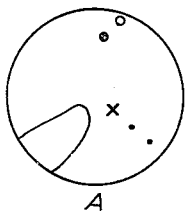
Figure 9:
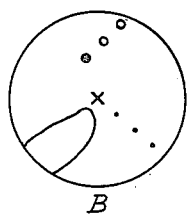
Figure 9:
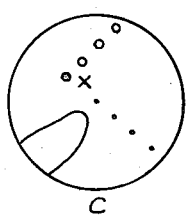
Figure 10:
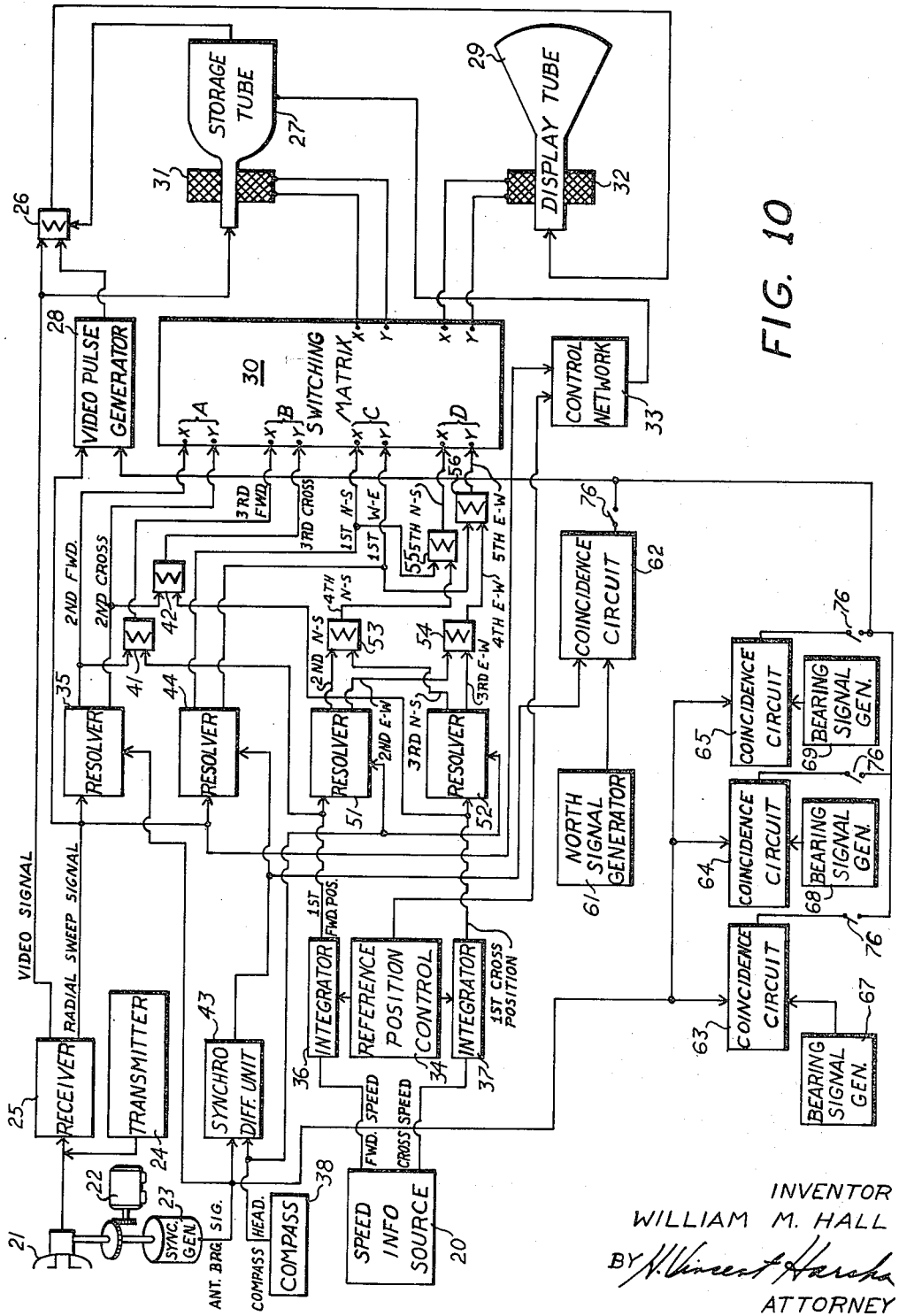

FIGS. 2 through 9 represent various combinations of these alternative choices as follows: FIG. 2 represents 1a, 2a and 3a (ship at center, relative bearing, relative motion). FIG. 3 represents 1a, 2a and 3b (ship at center, relative bearing, true motion). FIG. 4 represents 1a, 2b and 3a (ship at center, true bearing, relative motion). FIG. 5 represents 1a, 2b and 3b (ship at center, true bearing, true motion). FIG. 6 represents 1b, 2a and 3a (ship moving, relative bearing, relative motion). FIG. 7 represents 1b, 2a and 3b (ship at center, relative bearing, true motion). FIG. 8 represents 1b, 2b and 3a (ship moving, true bearing, relative motion). FIG. 9 represents 1b, 2b and 3b (ship moving, true bearing, true motion).

By way of further explanation it may be noted that FIGS. 2 and 6, 3 and 7, 4 and 8, and 5 and 9 are identical pictures except that the "frame" is different. In FIGS. 2 through 5 own ship is always at the center. In FIGS. 6 and 7 own ship always moves an equal distance toward the top of the pictures and there will be transverse motion of own ship position only if there is cross motion as a result of wind or current or the equivalent. In FIGS. 8 and 9 own ship moves on its true course so the present picture is identical in each case; that is 8A and 9A, 8B and 9B and 8C and 9C have the solid pictures identical, the difference between them being in what happens to the old or stored information. The present information on FIGS. 6 and 7 are always identical, the difference being in what happens to the stored information. Present information is identical in corresponding pairs of FIGS. 2 and 3, and present information is identical in corresponding pairs in FIGS. 4 and 5.

FIG. 10 illustrates how different presentations may be obtained. Referring now to FIG. 10 there is illustrated in schematic form a radar system employing the principles of the invention. An antenna 21, adapted to be rotated by a motor 22, is maintained on own ship and a signal, indicative of the bearing of the antenna relative to the ship's keel, is generated by a synchro generator 23. A pulse radar transmitter 24 and a radar receiver 25 are connected to antenna 21 in conventional manner.

Radar video information from the radar receiver 25 is supplied to a summing circuit 26 and also written into storage tube 27 for a time per radar search pulse appropriate to the range in use. The output signal of the video pulse generator 28 and the output signal of storage tube 27 is also supplied to the summing circuit 26 which supplies the video input signal to PPI 29. PPI 29 is a conventional cathode ray tube and storage tube 27 may be a type of cathode ray tube having a storage surface which is scanned by an electron beam. The beam may be swept by means of electrostatic deflection plates but since magnetic deflection coils are the more usual manner of controlling movement of the beam, magnetic deflection coils 31—32 are indicated in the schematic drawing. One function of the electron beam is to lay upon the storage surface an electrostatic charge pattern which represents the information impressed upon the input circuit of the storage tube 27. The electrostatic charge pattern remains on the storage surface until erased. The information stored in the storage tube can be read out without materially destroying the stored information, by causing the electron beam to scan the storage surface. It should be understood that the potential of the electron beam when writing information on the storage surface is different from the potential of the beam when reading out information. Thus certain electrode potentials of the storage tube must be changed when switching the storage tube from a "write" to a "read" function. The information on the storage surface is erased by causing the electron beam to scan that surface with a potential which is different from either the write or read potentials.

The storage tube 27 may be previously conditioned to write by conventional bias potentials originating in control network 33. During this write period, the storage surface of tube 27 is scanned by a suitable PPI radial sweep voltage supplied from switching matrix 30 to deflection coil 31. Switching matrix 30 also supplies a suitable radial sweep voltage to the deflection coil 32 of PPI 29. Control network 33 in combination with reference position control 34 is comprised of conventional components for controlling memory time, providing erasure of old information and recentering the picture on the storage tube 27. Preferably the control network 33 is adapted to switch the storage tube from read to write condition on alternate radial sweeps. This means that half of the time radar data from the radar is written on to the storage tube, and that the other half of the time the output of the storage tube is read off and is mixed with the video signal coming directly from the radar and supplied to the display tube 29. Alternatively, two or three or four scans may be written onto the storage tube while only one is read off. This would result in the storage tube accepting substantially all of the radar signal, and being read off only often enough to give a good picture on the display tube 29. Still further, a two-gun tube may be used if desired. Use of a two-gun storage tube will make it possible to write all of the radar data onto the storage tube and to read off from it continuously at the same time. A timing signal, comprised of a portion of the radial sweep signal, is supplied to the control network 33 to provide a timing signal for switching the storage tube 27 from read to write to erase condition. Reference position control 34 may be comprised of means for manually varying the first forward and cross component signals comprising the output signals from integrators 36—37. Variation of these signals allows adjustment of the origin of specific sweep voltages and manually selecting an initial position of own ship on the storage and display tubes. As time goes on, the position of own ship will continue to move, and unless readjusted, either manually or automatically, will eventually move off the map that is being presented on the display tube. A first sweep voltage designated by the letter A is supplied by a resolver 35 which resolves the radial sweep signal from the receiver 25 into its forward and cross components, identified on FIG. 10 as second forward and cross components which may be, for example, cosine and sine signals. The aforementioned second forward and cross components are the radial sweep voltage times the cosine and sine of the relative azimuth angle of the radial sweep respectively. The angle information is supplied by the antenna-bearing signal from 23 to the resolver 35. The second forward and cross component signals comprising the first sweep voltage are resolved by resolver 35 from the radial sweep signal and the antenna-bearing signal provided by generator 23. In FIG. 10 there is shown a speed information source 20 which may be, for example, a Doppler radar, a manual signal or a radio navigational system. For optimum performance a speed information source must provide both forward-speed and cross-speed signals. In the open sea, remote from land, it may not be considered essential that one have absolute motion with respect to the earth's surface, hence, forward motion with respect to the water's surface may be adequate. However, near land masses or other fixed targets precise data on motion relative to fixed targets is required. If desired a "speedometer" might be supplemented by a manual adjustment to correct for effects of current and wind, or an acoustic or radio Doppler system might be used which will give both forward and cross components of velocity or position. If the output of the source 20 is velocity or speed then it must be followed by integrators 36—37, the output signals of which will be determinative of position, or more properly change in position of own ship. FIG. 10 indicates the source 20 as having forward and cross speed output signals and the integrators 36—37 as having first forward and cross position output signals. As will be pointed out more clearly hereinafter, if the source 20 provides absolute position on a north-south and east-west coordinate system, for example, then these outputs may be combined with the output of the compass 38 in order to get the forward and cross position of own ship. Third forward and cross component signals comprising a second sweep voltage B are supplied by summing circuits 41—42 which respectively combine the second forward and cross component signals from resolver 35 and the first forward and cross component signals from integrators 36—37. In order to provide a radial sweep voltage that rotates in synchronism with the rotation or bearing of antenna 21 and to stabilize information to true north, antenna rotation or bearing information from synchro generator 23 and information from compass 38, such as a gyrocompass, having an output signal compatible with the antenna-bearing signal, are directed into a synchro differential unit 43. In the synchro differential unit 43 a different signal representing the angle between the instantaneous direction of propagation of antenna 21 and true north is generated and a resolver 44 in response to the difference output signal of unit 43 produces first north-south and east-west component signals (cosine and sine signals) which comprise a third sweep voltage C. A portion of the output signals of compass 38 and integrator 36 are directed to resolver 51 and a portion of the output signals of compass 38 and integrator 37 are directed to resolver 52. Resolvers 51—52 each provide respectively second and third north-south and east-west component signals. The north-south component signals from resolver 51 and resolver 52 are directed to a summing circuit 53 and the east-west component signals from resolvers 51—52 are each directed to a summing circuit 54. The output signals of summing circuits 53—54 are respectively fourth north-south and east-west component signals determinative of the true position of own ship. The aforementioned fourth north-south and east-west component signals are each combined respectively in summing circuits 55—56 with the first north-south and east-west component signals comprising the output of resolver 44. The output of summing circuits 55—56 form fifth north-south and east-west component signals comprising a fourth sweep voltage D. The four sweep voltages are supplied to switching matrix 30 for selectively applying different ones of the aforementioned four sweep voltages jointly and/or severally to the deflection coils 31—32. Switching matrix 30 may be, for example, a ganged switch adapted to permit the connection of the same or different sweep voltages to either or both the deflection coils 31—32.

To facilitate understanding of the invention the preceding discussion pertaining to FIG. 10 will now be summarized. The radar system provides three output signals: first, the video signal; second, a radial sweep signal starting coincident with the transmitted pulse; and third, an antenna-bearing signal such as a synchro output, which provides the bearing of the antenna relative to the ship's keel. The compass 38 provides a signal giving the heading of own ship in a form compatible with the antenna-bearing signal so that a portion of these two signals may be combined in the differential unit 43 to provide an antenna true-bearing signal. The forward and cross velocity component signals of the source 20 are integrated to provide forward and cross relative position component signals. Resolver 35 resolves the radial sweep signal into forward and cross component signals which comprise a first sweep voltage and resolver 44 resolves the radial sweep signal into north-south and east-west component signals which comprise a third sweep voltage. Resolver 51 resolves the forward position information into north-south and east-west component signals and resolver 52 resolves the cross position information into north-south and east-west component signals. Summing circuits 53—54 combine the north-south and east-west component signals from resolvers 51—52 to form north-south and east-west true position component signals. Summing circuits 41—42 combine the output signals of resolver 35 and integrators 36—37 to form forward and cross component signals comprising a second sweep voltage and summing circuits 55—56 combine the output signals of resolver 44 and summing circuits 53—54 to form north-south and east-west component signals comprising a fourth sweep voltage.

The four sweep voltages A—B—C—D provide the following information. Sweep voltage A comprising forward and cross component signals of the radial sweep signal, provides a sweep giving relative-bearing information with own ship staying at the center of the display, i.e., the origin of the sweep does not move. Sweep voltage B comprising forward and cross component signals of the radial sweep signal with their origin displaced in proportion to the forward and cross relative position component signals, provides a sweep giving absolute-position information, but on a coordinate system with one axis always parallel to the keel of the ship, but fixed in space, with own ship moving across it, i.e., the origin of the sweep moves in correspondence with the course and speed of own ship, with the direction of motion relative to the axis of the ship's keel. Sweep voltage C comprising north-south and east-west component signals of the radial sweep signal, provides a sweep giving true-bearing information with own ship staying at the center of the display, i.e., the origin of the sweep does not move. Sweep voltage D comprising north-south and east-west component signals of the radial sweep signal with their origin displaced in proportion to the north-south and east-west true position component signals, provides a sweep giving absolute-position information, but on a north-south east-west coordinate system with own ship moving across it, i.e., the origin of the sweep moves in correspondence with the true course and speed of own ship.

The sweep voltages for the storage tube and/or PPI are selectably provided by the switching matrix 30 and may come from any one of the four sets of sweep voltages previously described. The video input to the storage tube is a portion of the video output of the receiver and the video input to the display tube is the sum of a portion of the video output of the receiver, the video output of the storage tube, and the output of the video pulse generator.

At the present time relative motion with relative-bearing display is considered essential under some circumstances so that the existence of a collision course will be apparent from the fact that relative bearing to the target is unchanging and range is decreasing. However, as pointed out hereinbefore, such a display is generally confused by land targets and the like which smear all over the picture. The present invention makes this fact apparent by allowing the addition to the display of a number of cursors radiating, for example, from the own ship location on the display. Regardless of the choice of display, if one of these cursors is set on a target and the target then remains on the cursor (see FIG. 1) and the range decreases, the existence of a collision course is made apparent. Further, a ship's heading flasher may be added at will to true-bearing displays and a true-north flasher may be added to relative-bearing displays. If desired, true and relative-bearing dials may be added around the periphery of the PPI 29. Still further, another set of independent variables may be superimposed on the display if a reflection plotter surface is added. Such a reflection plotter surface may be turn-stabilized or not as desired.

Returning now to FIG. 10, the true-north flasher is provided by supplying the antenna true-bearing signal from differential unit 43 and the output signal of a north signal generator 61 to a coincidence circuit 62. The output signal of coincident circuit 62 is supplied to the video pulse generator 28 which causes a suitable signal to be supplied to the PPI 29. An output signal from coincidence circuit 62 is obtained when the phase angle of the output signal of the differential unit 43 representative of true north (zero degrees) is equal to the phase angle of the output signal of generator 61. Similarly, a ship's heading marker and arbitrary relative-bearing markers are provided by supplying a portion of the antenna-bearing signal to one or more coincidence circuits 63—64—65. The output signal of one or more bearing signal generators 67—68—69, the phase angles of which, for example, are different or variable, are also supplied to the aforementioned coincidence circuits 63—64—65. It is to be noted that although separate coincidence circuits and signal generators are shown in FIG. 10, such need not necessarily be the case. When an instantaneous value of the antenna-bearing output signal is equal to a signal representative of the ship's heading or a selectable bearing, an output signal will be obtained from the proper coincidence circuit and is supplied to the video pulse generator 28. Switches 76 are provided to selectably allow the application of the signals from the various coincidence circuits to the video pulse generator 28 and hence the appearance of markers on the display. A practical alternative to the system described immediately hereinabove is the provision of a trigger pulse coincident with the initiation of the radial sweep signal to initiate the video pulse.

By way of example and to illustrate the various displays that may be easily and quickly obtained, if sweep voltages from switching matrix 30 are supplied to the deflection coils 31—32 of the storage tube and cathode ray tube in the manner indicated below, the indicated displays will be obtained.

| Type of display | Sweep Voltage | | Display |
|---|---|---|---|
| | Storage Tube | PPI | |
| 1a, 2a, 3a | A | A | Fig. 2. |
| 1b, 2a, 3a | A | B | Fig. 6. |
| 1a, 2a, 3b | D | A | Fig. 3. |
| 1b, 2a, 3b | D | B | Fig. 7. |
| 1a, 2b, 3a | A | C | Fig. 4. |
| 1b, 2b, 3a | A | D | Fig. 8. |
| 1a, 2b, 3b | D | C | Fig. 5. |
| 1b, 2b, 3b | D | D | Fig. 9. |

Obviously, many other combinations of sweep voltages are possible which would be of real interest. For example, as long as one was proceeding on the same course, it would be advantageous to stabilize the stored information in azimuth by using sweep voltage C. This would prevent the cluttering up of the storage tube as the ship yawed.

It may now be readily appreciated that the invention described above makes possible a plurality of selectable novel and more facile radar displays that can present a situation most advantageously for different purposes, needs or preferences.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A radar display system for use on a movable vehicle comprising: a radar receiver; a memory tube having a storage surface adapted to be scanned by an electron beam; means for impressing the output of said receiver upon the input circuit of said memory tube; a cathode ray display tube coupled to the output circuit of said memory tube and said receiver; and means for providing a plurality of sweep voltages in said tubes, said means including means for selectively applying said sweep voltages to said tubes, a first sweep voltage being effective to cause the origin of its sweep to remain centered and show all objects at their relative bearings, a second sweep voltage being effective to cause the origin of its sweep to move in accordance with a heading and speed of said vehicle and show all objects at their relative bearing, a third sweep voltage being effective to cause the origin of its sweep to remain centered and show all objects at their true bearing, and a fourth sweep voltage being effective to cause the origin of its sweep to move in accordance with the true heading and speed of said vehicle and show all objects at their true bearing.

2. A radar display system for use on a movable vehicle comprising: a radar receiver; a memory tube having a storage surface adapted to be scanned by an electron beam; means for impressing the output of said receiver upon the input circuit of said memory tube; a cathode ray display tube coupled to the output circuit of said memory tube and said receiver; means for providing a plurality of sweep voltages in said tubes; and means for selectively applying different ones of said sweep voltages jointly and severally to said tubes, a first sweep voltage being effective to cause the origin of the sweep to remain centered and show all objects at their relative bearings, a second sweep voltage being effective to cause the origin of said sweep to move in accordance with a heading and speed of said vehicle and show all objects at their relative bearing, a third sweep voltage being effective to cause the origin of said sweep to remain centered and show all objects at their true bearing, and a fourth sweep voltage being effective to cause the origin of said sweep to move in accordance with the true heading and speed of said vehicle and show all objects at their true bearing.

3. A radar display system for use on a movable vehicle comprising: a radar receiver; a memory tube for storing electrical signal information and having a storage surface adapted to be scanned by an electron beam; means for impressing the output of said receiver comprising electrical signal information upon the input circuit of said memory tube; a cathode ray display tube coupled to the output circuit of said memory tube and said receiver for displaying stored and current information; means for providing a plurality of separate sweep voltages for sweeping said electron beam and said cathode ray; and means for selectively applying different ones of said sweep voltages jointly and severally to said tubes, said sweep voltages comprising a first sweep voltage effective to cause the origin of its sweep to remain centered and show all objects at their relative bearings, a second sweep voltage effective to cause the origin of its sweep to move in accordance with the relative heading and speed of said vehicle and show all objects at their relative bearing, a third sweep voltage effective to cause the origin of its sweep to remain centered and show all objects at their true bearing, and a fourth sweep voltage effective to cause the origin of its sweep to move in accordance with the true heading and speed of said vehicle and show all objects at their true bearing.

4. A radar display system for use on a movable vehicle comprising: a radar transmitter having a rotatable directional antenna; a gyro compass having an electrical output signal; a radar receiver having a video output signal, a radial sweep output signal and an antenna-bearing output signal; a memory tube having a storage surface adapted to be scanned by an electron beam; means for deflecting said electron beam; means for impressing said video output signal upon the input circuit of said memory tube; a cathode ray display tube coupled to the output circuit of said memory tube and the video output circuit of said receiver; means for deflecting said cathode ray; means for providing a source of electrical signal intelligence determinative of the relative position of said vehicle; means responsive to said radial sweep and antenna-bearing signals for providing a first sweep voltage in synchronism with said antenna and having a fixed origin; means for combining said electrical signal intelligence and said first sweep voltage to provide a second sweep voltage in synchronism with said antenna and having an origin movable in correspondence with the course and speed of said vehicle; means responsive to said radial sweep and antenna-bearing signal and said compass output signal for providing a third sweep voltage in synchronism with the true bearing of said antenna and having a fixed origin; means responsive to said compass output signal and said electrical signal intelligence and said third sweep voltage for providing a fourth sweep voltage having an origin movable in correspondence with the true course and speed of said vehicle; and means for selectively applying said sweep voltages to said memory tube and display tube deflecting means.

5. A radar display system for use on a movable vehicle comprising: a radar transmitter having a rotatable directional antenna; a gyro compass having an electrical output signal; a radar receiver having a video output signal, a radial sweep output signal and an antenna-bearing output signal; a memory tube having a storage surface adapted to be scanned by an electron beam; means for deflecting said electron beam; means for impressing said video output signal upon the input circuit of said memory tube; a cathode ray display tube coupled to the output circuit of said memory tube and the video output circuit of said receiver; means for deflecting said cathode ray; means for providing a source of electrical signal intelligence determinative of the position of said vehicle; means responsive to said radial sweep and antenna-bearing signals for providing a first sweep voltage in synchronism with said antenna and having a fixed origin whereby all objects will be shown at their relative bearings; means for combining said electrical signal intelligence and said first sweep voltage to provide a second sweep voltage in synchronism with said antenna and having an origin movable in correspondence with the course and speed of said vehicle whereby all objects will be shown at their relative bearing; means responsive to said radial sweep and antenna-bearing signal and said compass output signal for providing a third sweep voltage in synchronism with the true bearing of said antenna and having a fixed origin whereby all objects will be shown at their true bearing; means responsive to said compass output signal and said electrical signal intelligence and said third sweep voltage for providing a fourth sweep voltage having an origin movable in correspondence with the true course and speed of said vehicle whereby all objects will be shown at their true bearing; and means for selectively applying said sweep voltages to said memory tube and display tube deflecting means.

6. A radar display system for use on a movable vehicle comprising: a radar transmitter having a rotatable directional antenna; a gyro compass having an electrical output signal; a radar receiver having a video output signal, a radial sweep output signal and an antenna-bearing output signal in correspondence with the relative bearing of said antenna; a memory tube having a storage surface adapted to be scanned by an electron beam; means for deflecting said electron beam; means for impressing said video output signal upon the input circuit of said memory tube; a cathode ray display tube coupled to the output circuit of said memory tube and the video output circuit of said receiver; means for deflecting said cathode ray; means for providing forward and cross component signals determinative of position of said vehicle; means responsive to said radial sweep and antenna-bearing signals for providing forward and cross component signals of said radial sweep signal comprising a first sweep voltage in synchronism with said antenna and having a fixed origin; means for combining said forward and cross component signals determinative of position and said first sweep voltage to provide forward and cross component signals of said radial sweep signal comprising a second sweep voltage in synchronism with said antenna and having an origin movable in correspondence with the course and speed of said vehicle; means responsive to said radial sweep and antenna-bearing signal and said compass output signal for providing north-south and east-west component signals of said radial sweep signal comprising a third sweep voltage in synchronism with the true bearing of said antenna and having a fixed origin; means responsive to said compass output signal and said forward and cross componnet signals determinative of position and said third sweep voltage for providing north-south and east-west component signals determinative of true position comprising a fourth sweep voltage having an origin movable in correspondence with the true course and speed of said vehicle; and means for selectively applying said sweep voltages to said memory tube and display tube deflecting means.

7. A radar display system for use on a movable vehicle comprising: a radar transmitter having a rotatable directional antenna; a gyro compass having an electrical output signal; a radar receiver having a video output signal, a radical sweep output signal and an antenna-bearing output signal in correspondence with the relative bearing of said antenna; a memory tube having a storage surface adapted to be scanned by an electron beam; means for deflecting said electron beam; means for impressing said video output signal upon the input circuit of said memory tube; a cathode ray display tube coupled to the output circuit of said memory tube and the video output circuit of said receiver; means for deflecting said cathode ray; means for providing forward and cross component signals determinative of position of said vehicle; means responsive to said radial sweep and antenna-bearing signals for providing forward and cross component signals of said radial sweep signal comprising a first sweep voltage in synchronism with said antenna and having a fixed origin whereby all objects will be shown at their relative bearings; means for combining said forward and cross component signals determinative of position and said first sweep voltage to provide forward and cross component signals of said radial sweep signal comprising a second sweep voltage in synchronism with said antenna and having an origin movable in correspondence with the course and speed of said vehicle whereby all objects will be shown at their relative position; means responsive to said radial sweep and antenna-bearing signal and said compass output signal for providing north-south and east-west component signals of said radial sweep signal comprising a third sweep voltage in synchronism with the true bearing of said antenna and having a fixed origin whereby all objects will be shown at their true bearings; means responsive to said compass output signal and said forward and cross component signals determinative of position and said third sweep voltage for providing north-south and east-west component signals determinative of true position comprising a fourth sweep voltage having an origin movable in correspondence with the true course and speed of said vehicle whereby all objects will be shown at their true position; and means for selectively applying said sweep voltages to said memory tube and display tube deflecting means.

8. A radar display system for use on a movable vehicle comprising: a radar transmitter having a rotatable directional antenna; a gyro compass having an electrical output signal; a radar receiver having a video output signal, a radial sweep output signal and an antenna-bearing output signal proportional to the relative bearing of said antenna; a memory tube having a storage surface adapted to be scanned by an electron beam; means for deflecting said electron beam; means for impressing said video output signal upon the input circuit of said memory tube; a cathode ray display tube coupled to the output circuit of said memory tube and the video output circuit of said receiver; means for deflecting said cathode ray; means for providing forward and cross component signals determinative of position of said vehicle; means responsive to said radial sweep and antenna-bearing signals for providing forward and cross component signals of said radial sweep signal comprising a first sweep voltage in synchronism with said antenna and having a fixed origin whereby all objects will be shown at their relative bearings; means for combining said forward and cross component signals determinative of position and said first sweep voltage to provide forward and cross component signals of said radial sweep signal comprising a second sweep voltage in synchronism with said antenna and having an origin movable in correspondence with the course and speed of said vehicle whereby all objects will be shown at the relative position; means responsive to said radial sweep and antenna-bearing signal and said compass output signal for providing north-south and east-west component signals of said radial sweep signal comprising a third sweep voltage in synchronism with the true bearing of said antenna and having a fixed origin whereby all objects will be shown at their true bearings; means responsive to said compass output signal and said forward and cross component signals determinative of position and said third sweep voltage for providing north-south and east-west component signals determinative of true position comprising a fourth sweep voltage having an origin movable in correspondence with the true course and speed of said vehicle whereby all objects will be shown at their true position; means for selectively applying said sweep voltages to said memory tube and display tube deflecting means; and means comprising a control network connected to said memory tube and said means for providing forward and cross component signals determinative of position for controlling memory time and erasure of old information in said memory tube and adjustment of the origin of said second and fourth sweep voltages.

9. A radar display system for use on a movable vehicle comprising: a radar transmitter having a rotatable directional antenna; a gyro compass having an electrical output signal; a radar receiver having a video output signal, a radial sweep output signal and an antenna-bearing output signal proportional to the relative bearing of said antenna; a memory tube having a storage surface adapted to be scanned by an electron beam; means for deflecting said electron beams; means for impressing said video output signal upon the input circuit of said memory tube; a cathode ray display tube coupled to the output circuit of said memory tube and the video output circuit of said receiver; means for deflecting said cathode ray; means for providing first forward and cross component signals determinative of the position of said vehicle relative to a fixed point; first resolver means for resolving a portion of said radial sweep and antenna-bearing signals into second forward and cross component signals comprising a first sweep voltage in synchronism with said antenna and having a fixed origin whereby all objects will be shown at their relative bearings; means including a first summing circuit for combining a portion of said first forward and cross component signals and said second forward and cross component signals to provide third forward and cross component signals comprising a second sweep voltage in synchronism with said antenna and having an origin movable in correspondence with the relative course and speed of said vehicle whereby all objects will be shown at their relative position; means including a differential unit responsive to a portion of said antenna bearing and compass output signals and a second resolver for receiving a portion of the output signal of said differential unit and a portion of said radial sweep signal for providing first north-south and east-west component signals comprising a third sweep voltage in synchronism with the true bearing of said antenna and having a fixed origin whereby all objects will be shown at their true bearings; a third resolver for resolving a portion of said compass output signal and a portion of the said first forward component signal into second north-south and east-west component signals; a fourth resolver for resolving a portion of said compass output signal and a portion of the said first cross component signal into third north-south and east-west component signals; a second summing circuit for combining said second and third north-south component signals into a fourth north-south component signal and said second and third east-west component signals into a fourth east-west component signal; a third summing circuit for combining said fourth north-south and east-west component signals and said first north-south and east-west component signals to provide fifth north-south and east-west component signals comprising a fourth sweep voltage having an origin movable in correspondence with the true course and speed of said vehicle whereby all objects will be shown at their true position; switching means for selectively applying said sweep voltages to said memory tube and display tube deflecting means; and means comprising a control network connected to said memory tube and said means for providing said first forward and cross component signals for controlling memory time and erasure of old information in said memory tube and adjustment of the origin of said second and fourth sweep voltages.

References Cited in the file of this patent
UNITED STATES PATENTS 2,701,352    Kingdon _____ Feb. 1, 1955
2,742,637    Braddon _____ Apr. 17, 1956